United States Patent
Runft et al.

(10) Patent No.: US 8,266,874 B2
(45) Date of Patent: Sep. 18, 2012

(54) WEIGHING DEVICE FOR A PACKAGING MACHINE

(75) Inventors: Werner Runft, Winnenden (DE);
Thomas Franck, Lorch-Weitmars (DE);
Torsten Grass, Urbach (DE)

(73) Assignee: Robert Bosch GmbH, Stuttgart (DE)

( * ) Notice: Subject to any disclaimer, the term of this patent is extended or adjusted under 35 U.S.C. 154(b) by 922 days.

(21) Appl. No.: 12/093,986

(22) PCT Filed: Oct. 30, 2006

(86) PCT No.: PCT/EP2006/067914
§ 371 (c)(1),
(2), (4) Date: May 16, 2008

(87) PCT Pub. No.: WO2007/062947
PCT Pub. Date: Jun. 7, 2007

(65) Prior Publication Data
US 2008/0219803 A1     Sep. 11, 2008

(30) Foreign Application Priority Data
Nov. 30, 2005 (DE) .......................... 10 2005 057 393

(51) Int. Cl.
*B65B 31/02* (2006.01)
*B65B 31/04* (2006.01)

(52) U.S. Cl. ................ 53/432; 53/560; 53/534; 53/900; 141/83

(58) Field of Classification Search ................... 141/83; 53/900, 432, 520, 560, 534; 73/865.8
See application file for complete search history.

(56) References Cited

U.S. PATENT DOCUMENTS

| | | | |
|---|---|---|---|
| 3,802,547 A * | 4/1974 | Wagers et al. ............. | 198/471.1 |
| 4,640,376 A * | 2/1987 | Hinzpeter ........................ | 177/50 |
| 5,038,839 A | 8/1991 | Morimoto et al. | |
| 5,515,740 A | 5/1996 | Gamberini | |
| 5,750,938 A * | 5/1998 | De Caris et al. ................. | 177/50 |
| 5,852,259 A * | 12/1998 | Yanase ........................... | 177/145 |
| 6,258,400 B1 * | 7/2001 | Brehant et al. ............... | 427/2.14 |

(Continued)

FOREIGN PATENT DOCUMENTS

EP    1 582 193 A1    10/2005

(Continued)

*Primary Examiner* — Dinh Q Nguyen
*Assistant Examiner* — Jennifer Gordon
(74) *Attorney, Agent, or Firm* — Michael Best & Friedrich LLP

(57) ABSTRACT

The invention relates to a weighing device for a packaging machine. Empty capsules that are still closed are removed from a capsule holder, weighed on a gravimetric scale, placed back into an empty capsule holder, and then taken apart. The device makes it possible to remove empty capsules and replace them at full machine speed, without a loss of any consequence in output. It is possible to use a gravimetric measurement method to carry out a tare weighing of the capsules. An additional weighing device for filled capsules is integrated into a capsule transport device to determine the net weight based on the tare weight and the weight of the full capsules. Such a combination of a gravimetric tare weighing and a gross weighing to statistically determine the net weight is particularly well-suited to an intermediate capsule filling device.

21 Claims, 14 Drawing Sheets

U.S. PATENT DOCUMENTS

| | | | |
|---|---|---|---|
| 7,650,733 B2 * | 1/2010 | Wilson et al. | 53/560 |
| 2005/0217207 A1 * | 10/2005 | Konishi et al. | 53/53 |
| 2005/0217752 A1 * | 10/2005 | Facchini | 141/146 |
| 2005/0230000 A1 | 10/2005 | Gamberini | |
| 2006/0076077 A1 * | 4/2006 | Kaplan et al. | 141/83 |
| 2007/0062164 A1 * | 3/2007 | Gamberini | 53/502 |

FOREIGN PATENT DOCUMENTS

| | | |
|---|---|---|
| GB | 2 269 354 A | 2/1994 |
| JP | 356202 A | 3/1991 |
| JP | 2005292148 A | 10/2005 |
| WO | WO 2006035285 A2 * | 4/2006 |

* cited by examiner

WEIGHING DEVICE FOR A PACKAGING MACHINE

CROSS-REFERENCE TO RELATED APPLICATION

This application is a 35 USC 371 application of PCT/EP 2006/067914 filed on Oct. 30, 2006.

BACKGROUND OF THE INVENTION

1. Field of the Invention

The invention relates to a weighing device for a packaging machine.

2. Description of the Prior Art

DE 100 01 068 C1 has already disclosed a device for metering and dispensing powder into hard gelatin capsules or the like. As tamping pins descend into bores, they compress the powder, which is to be packaged, into pellets. In order to be able to obtain information about the mass of the pellets, means are provided that detect the spring path of the tamping pin directly preceding the ejecting pin.

In the capsule filling machines currently in use, usually the capsules are weighed after being filled, i.e. the combined weight of the capsule and filling (gross weight) is determined in order to check whether the filling quantity is correct. There are several methods for accomplishing this, e.g. weighing with a scale, weight determination through other physical effects, etc. using the statistical method. This method is imprecise due to a significant variance in weight of the empty capsules. There are also known methods in which the net weight is determined by a gross minus tare calculation. In these methods, capacitive physical effects are used, an approach that involves significant inaccuracies that are contingent on the system.

The object of the present invention is to eliminate or at least mitigate the above-mentioned disadvantages.

SUMMARY OF THE INVENTION

The device and method according to the invention increase the precision of the weight determination since it possible to eliminate imprecise capacitive methods for net weight determination. In addition, the capsules can be reliably and quickly removed, for example for weight determination, since at least one transport pin acts on the underside of the capsule and serves as a support during the removal of at least one capsule.

Other suitable embodiments ensue from the drawings and the detailed description.

BRIEF DESCRIPTION OF THE DRAWINGS

An exemplary embodiment of the invention is shown in the drawings and will be explained in detail in the subsequent description.

DETAILED DESCRIPTION OF PREFERRED EMBODIMENTS

Figure 1:
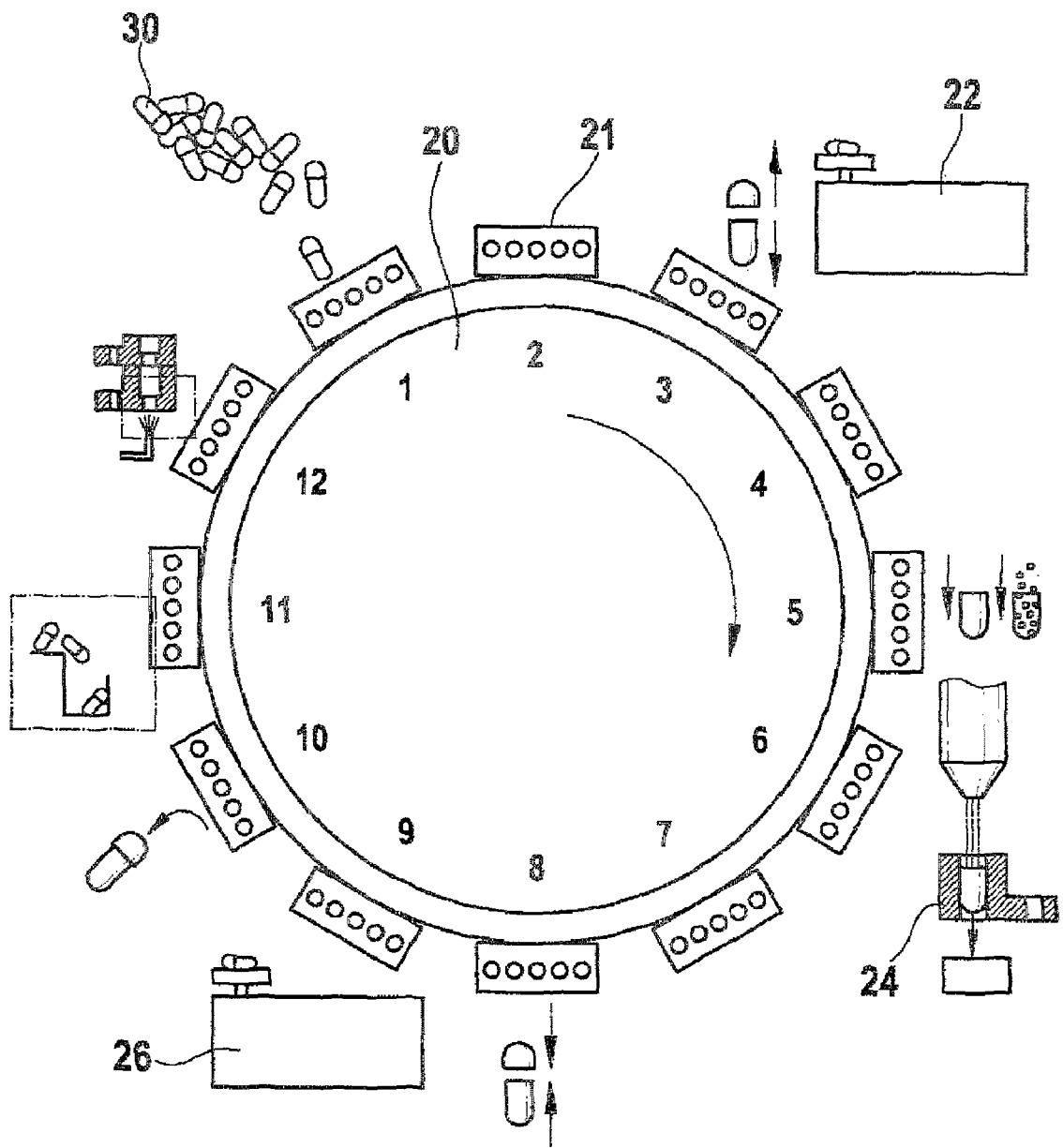
FIG. 1 shows the arrangement of stations of a packaging machine, with transfer devices and weighing devices.
Figure 2:
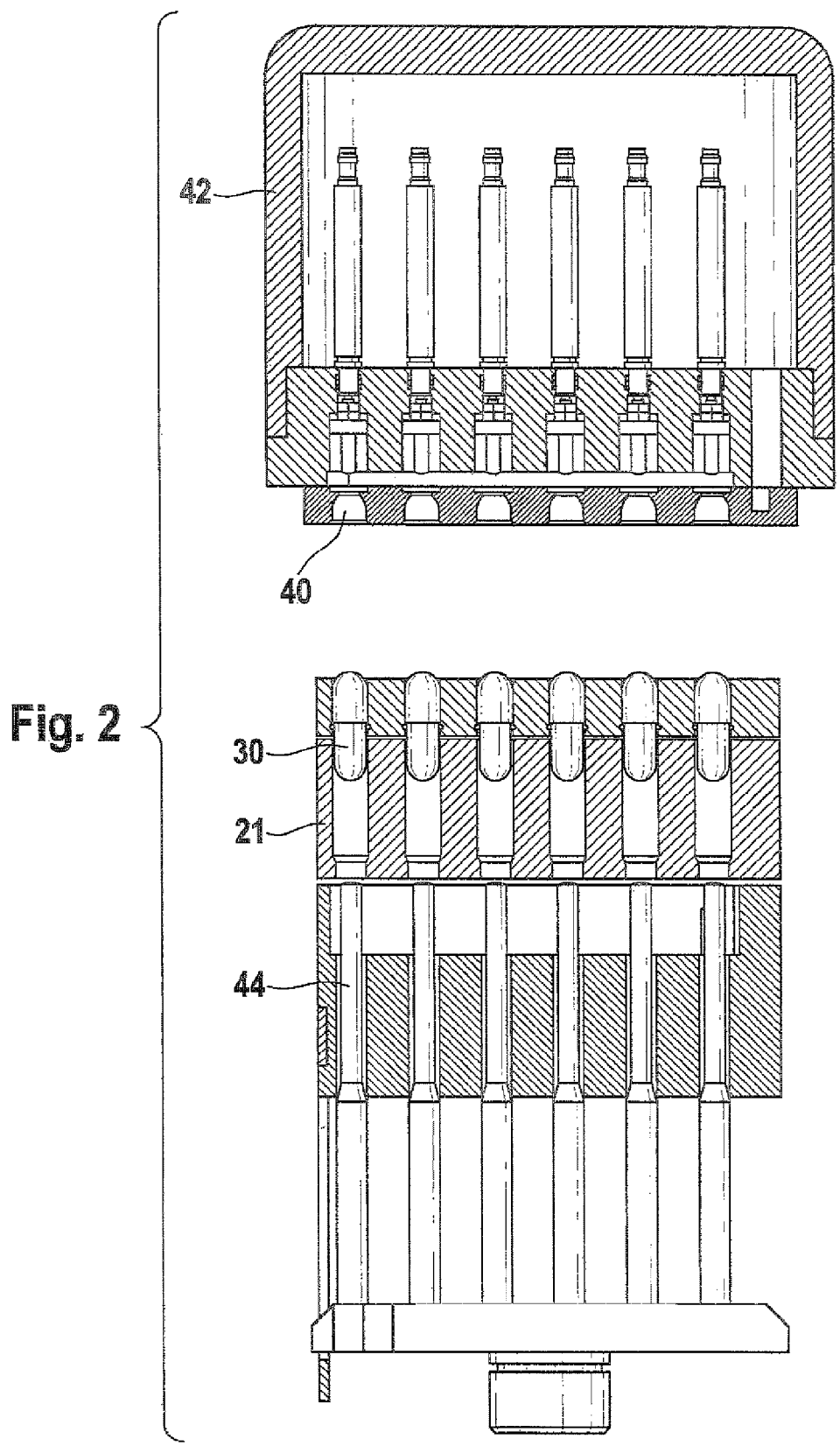
FIG. 2 is a side view of a transfer device with a capsule holder at station 3.

A machine for filling and closing capsules 30 composed of a capsule bottom and a cap slid onto it has a twelve-part advancing wheel 20 that is rotated in steps around a vertical axis, with the individual handling devices situated at the stations 1 through 12 along the circumferential path of the wheel. At 1, the empty capsules 30 to be filled are loaded in a randomly ordered fashion, aligned, and then placed in an ordered fashion onto a capsule holder 21 of an advancing wheel 20. The capsules, which are still closed, are then removed from the capsule holder 21, weighed by a weighing device 22, then placed back into an empty capsule holder 21, and then the caps are removed from the bottoms. At 5, the filling, e.g. a powdered pharmaceutical product, is dispensed into the capsule bottoms. At 6, a weight testing system 24 checks the filling that has been dispensed into the capsule bottoms. At station 8, the capsules 30 are closed again. At 9, the gross weight of the filled capsules is determined by an additional weighing device 26. At 10, the capsules 30 are sealed, and at the subsequent station 11, they are ejected.

The invention describes how empty capsules 30 that are still closed can be removed from the capsule holder 21, weighed on a gravimetric scale 22, then placed back into an empty capsule holder 21, and taken apart. This device makes it possible to remove empty capsules 30 and replace them at full machine speed, without a loss of any consequence in output. It is possible to use a gravimetric measurement method to carry out a tare weighing of the capsules 30. If the additional weighing device 26 for filled capsules 30 is integrated into the capsule transport, it is then possible to determine the net weight based on the tare weight and the weight of the full capsules 30. Such a combination of a gravimetric tare weighing and a gross weighing to statistically determine the net weight is particularly well-suited to an intermediate capsule filling device. In addition, such a system is also capable of calibrating a 100% weight testing system 24 on another physical basis (e.g. X-ray).

In the synchronously functioning capsule filling machine, the capsule holder 21 filled with capsules 30 arrives for the removal of the capsules 30 as part of the weighing at station 3. The capsule holder 21 is composed of openings into which the capsules 30 to be transported have been placed. Transport pins 44 are situated underneath these openings and are able to move vertically toward the underside of the capsules 30. In station 3, the capsule holder 21 and the transfer device 42 are situated so that the vacuum openings 40 of the transfer device 42 cover the capsule tops.

Figure 3:
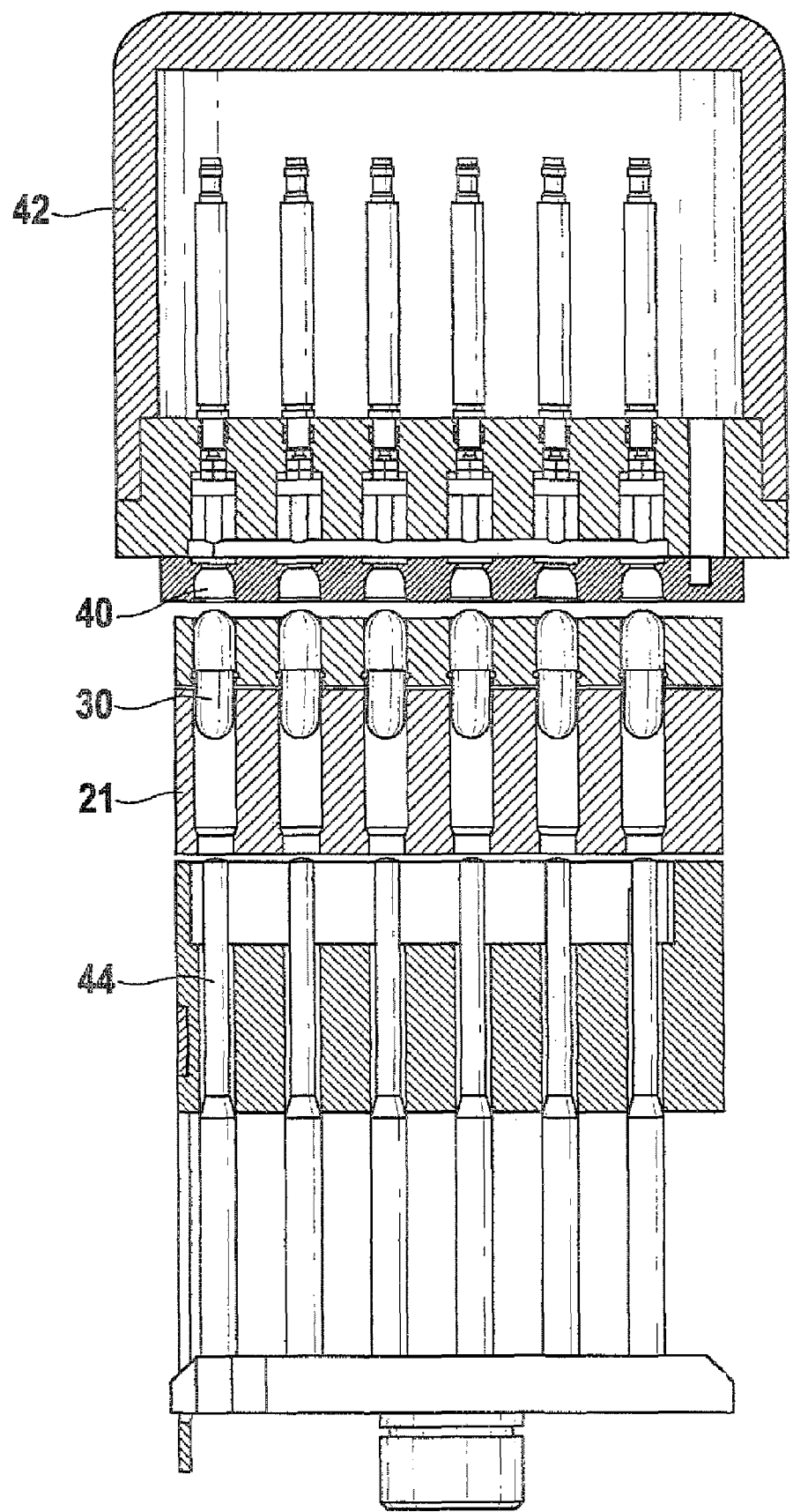
FIG. 3 shows the transfer device with the capsule holder, with the transfer device lowered.
Figure 4:
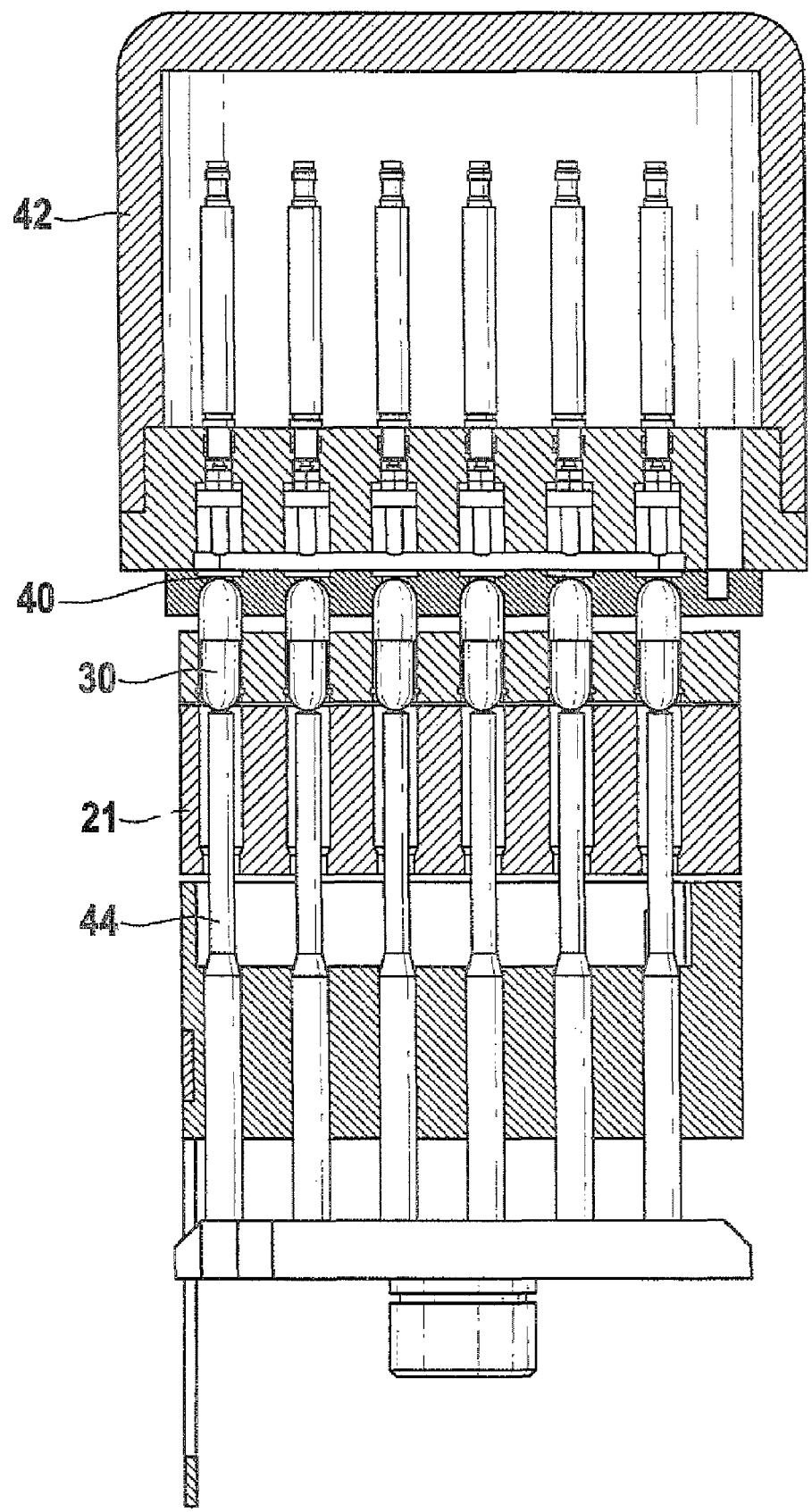
FIG. 4 shows the transfer device with the capsule holder during upward capsule transport.
Figure 5:
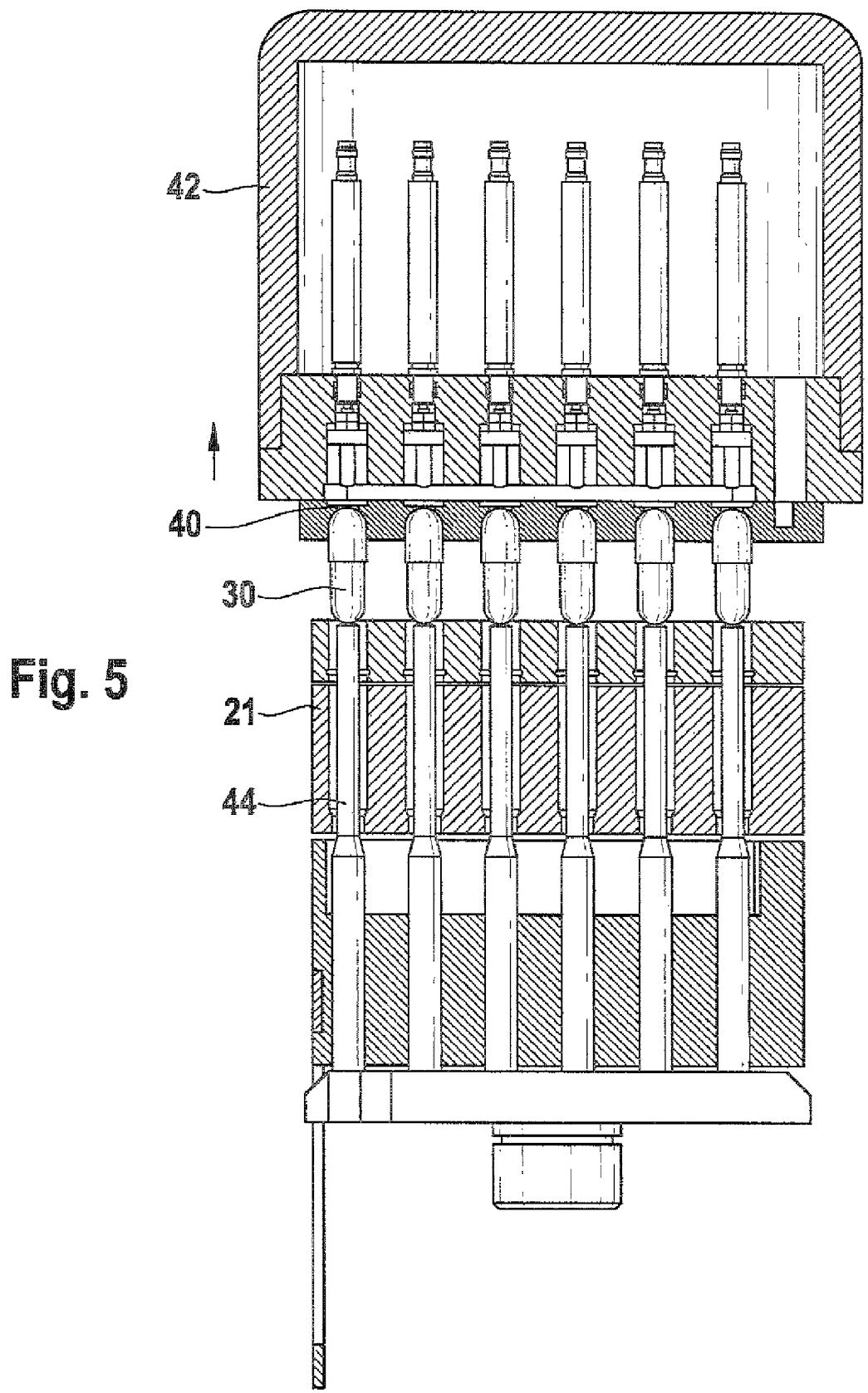
FIG. 5 shows the transfer device with the capsule holder during upward capsule transport, with support provided by the transport pins.
Figure 6:
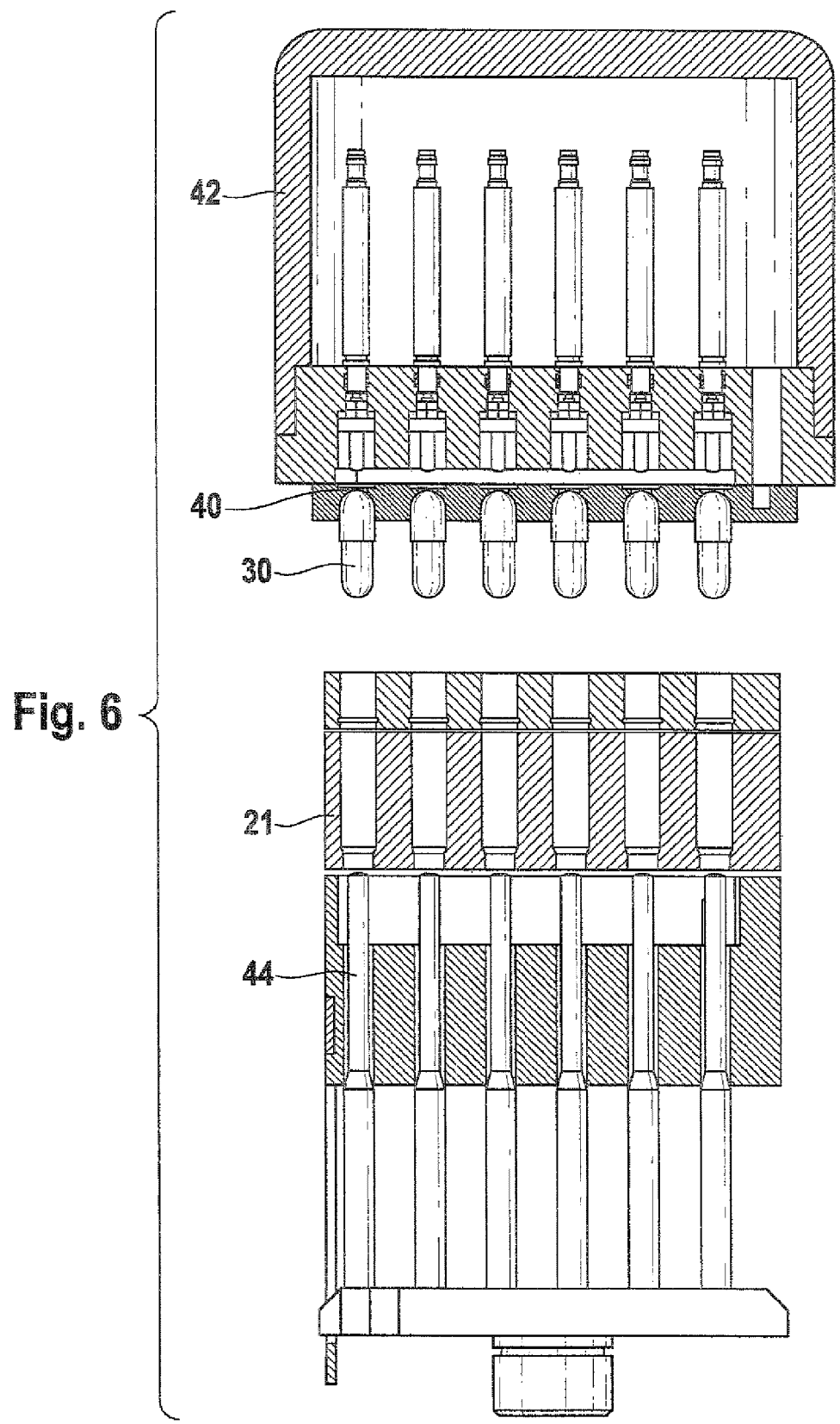
FIG. 6 shows the pivoting of the transfer device with suction applied to the capsules.
Figure 7:
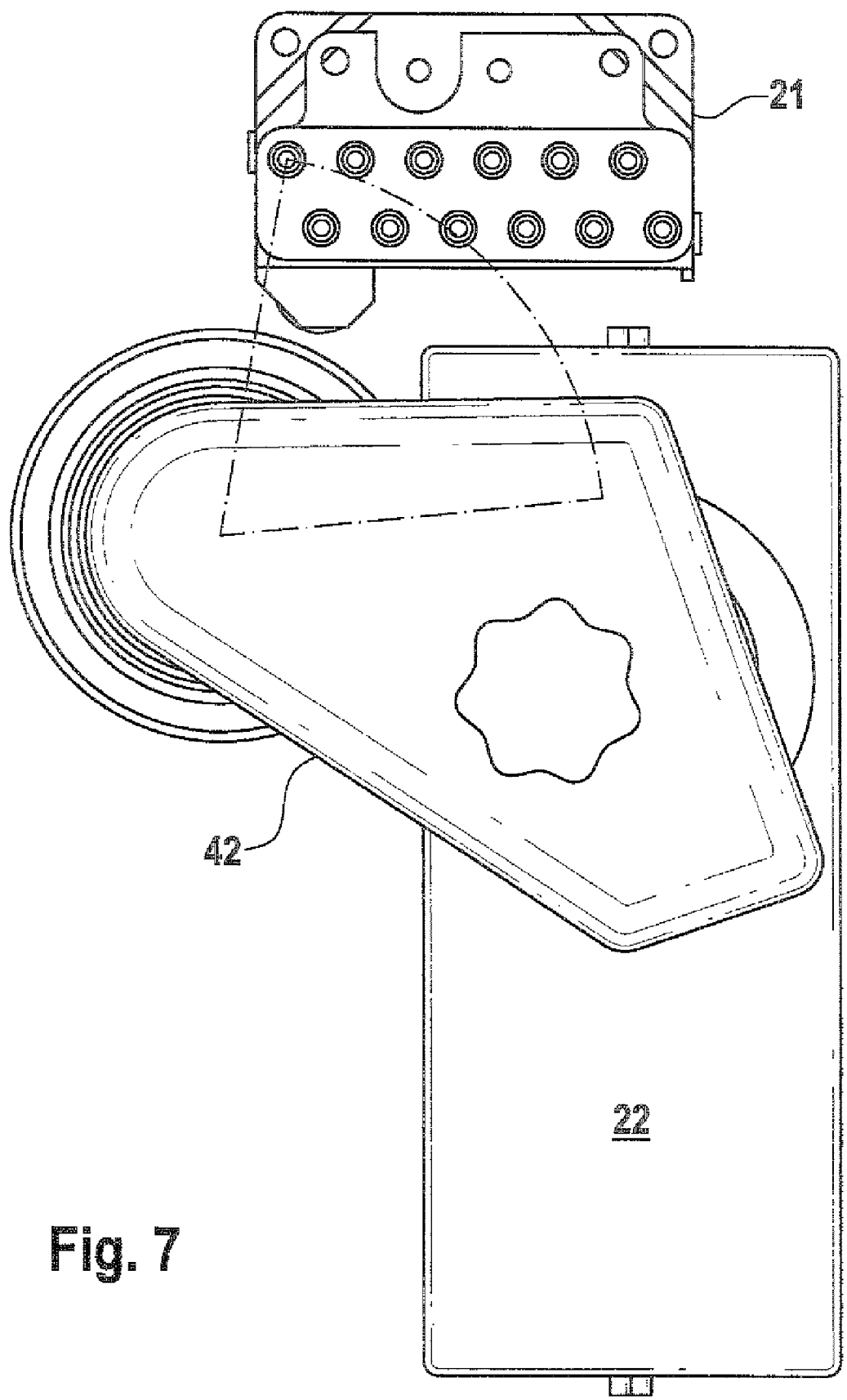
FIG. 7 is a top view of the transfer device, capsule holder, and weighing device.
Figure 8:
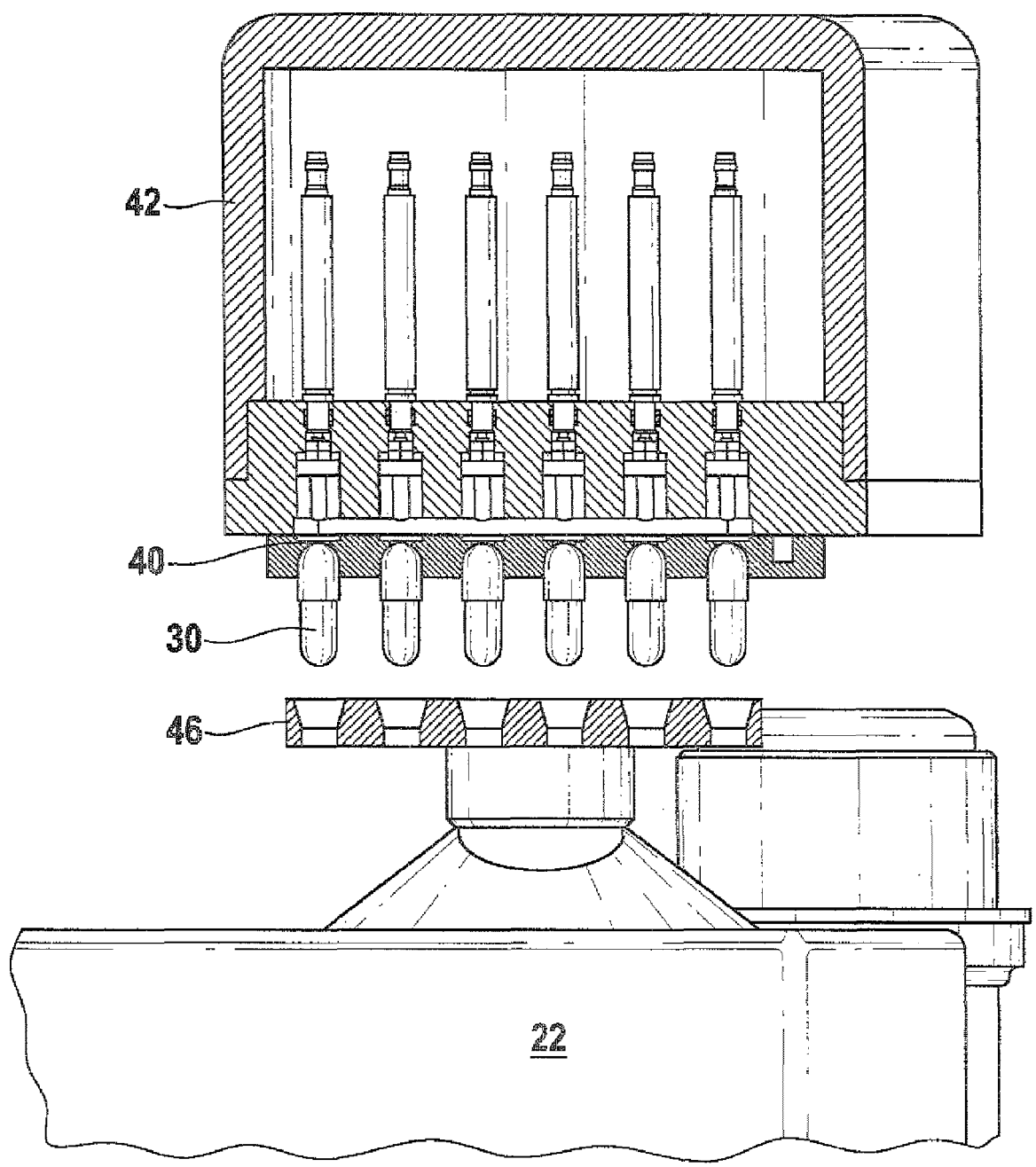
FIG. 8 is a side view of the transfer device in connection with the weighing device.

As shown in FIG. 3, the transfer device 42 is moved downward toward the capsule holder 21. According to FIG. 4, the transport pins 44 are moved upward to hold the capsules 30 in order to prevent them from coming apart. In addition, a vacuum is supplied to the vacuum bores 40 in order to apply suction to the capsules 30 and lift them out of the openings of the capsule holder 21 (FIG. 5) and, after they have been lifted further, to pivot them to the weighing device 22 (FIG. 6). The above-described arrangement is depicted in a top view in FIG. 7.

Figure 9:
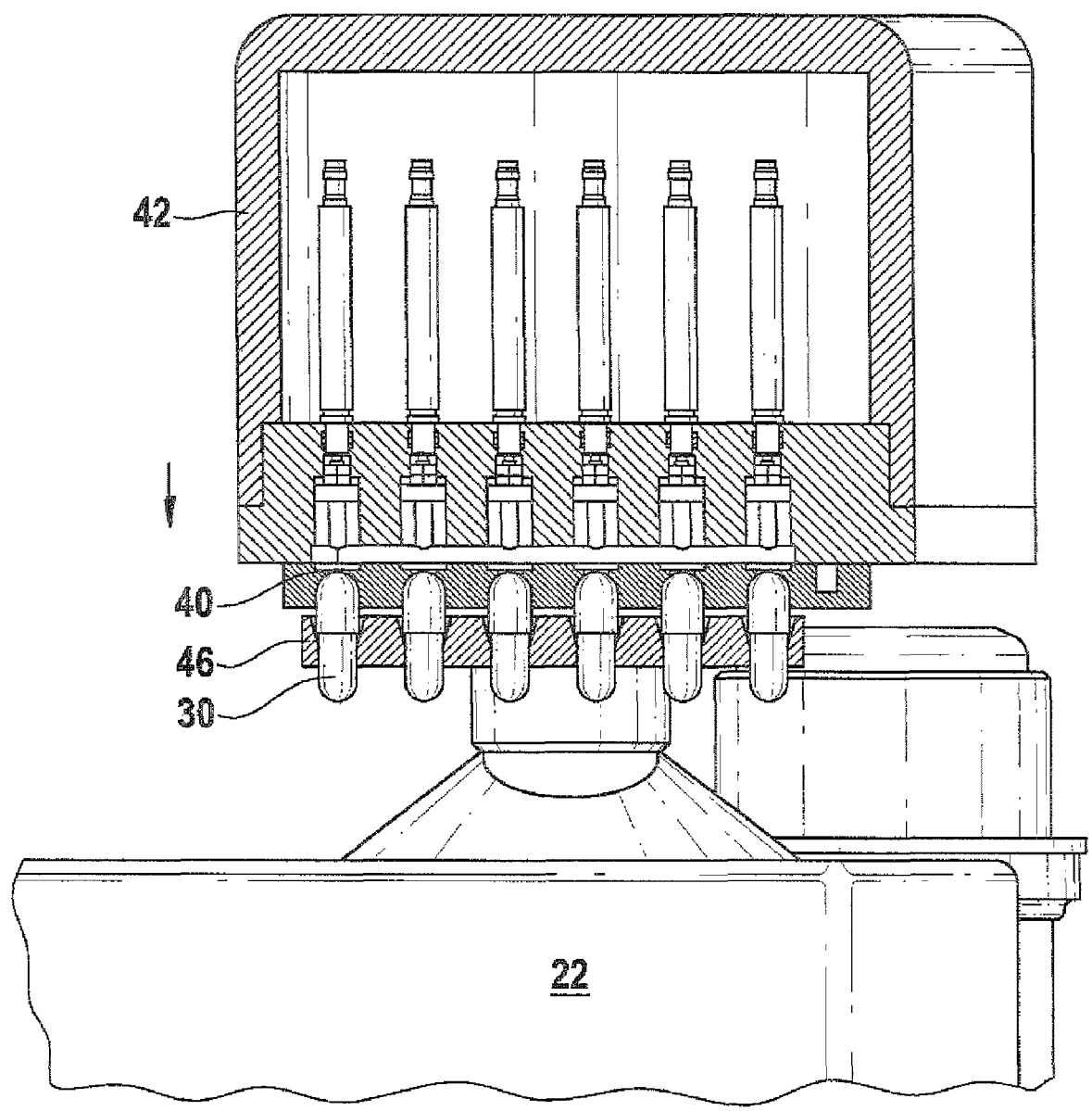
FIG. 9 shows the transfer device as the capsules are being lowered onto the weighing dish of the weighing device.
Figure 10:
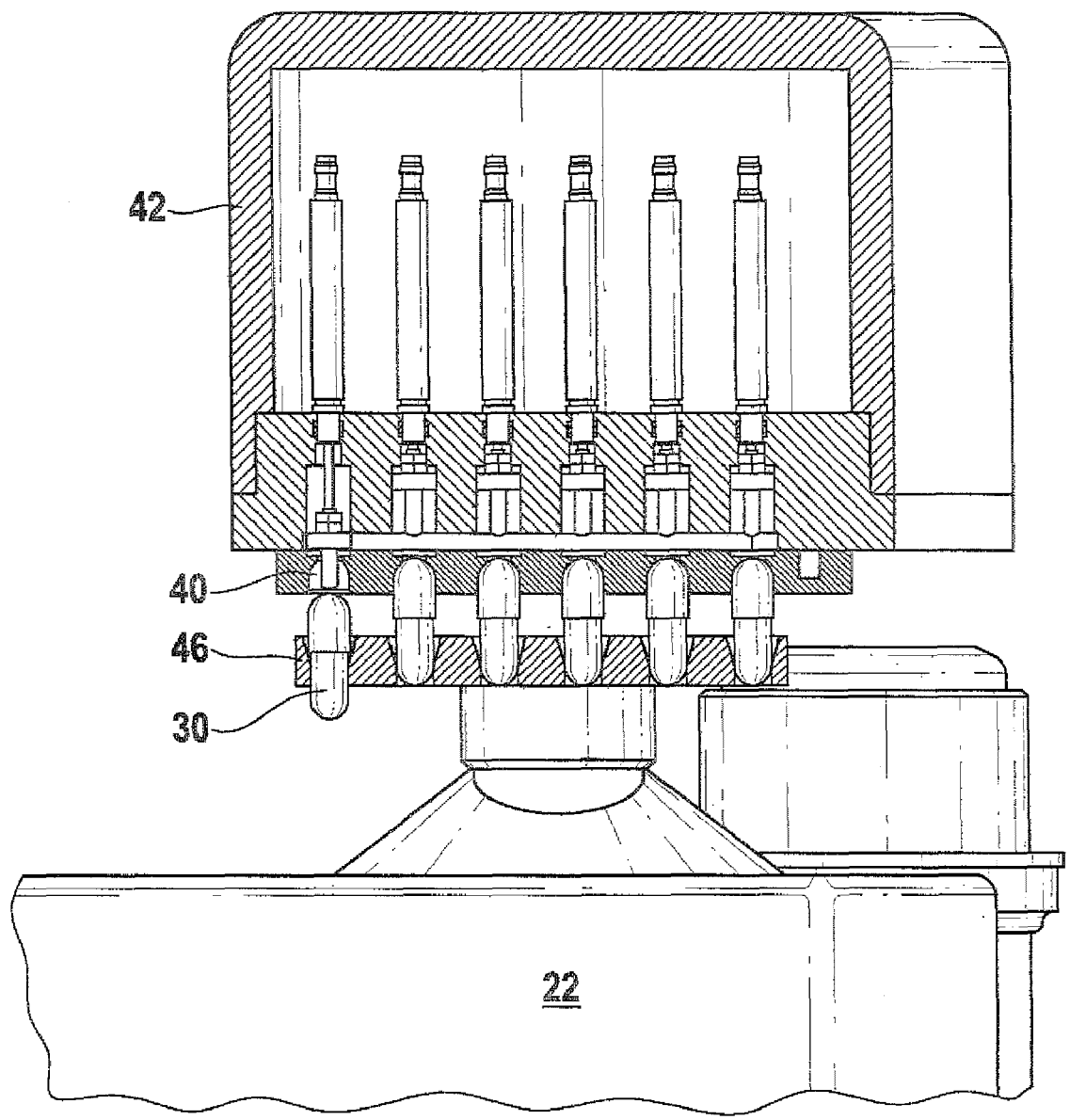
FIG. 10 shows the depositing of the first capsule onto the weighing dish.
Figure 11:
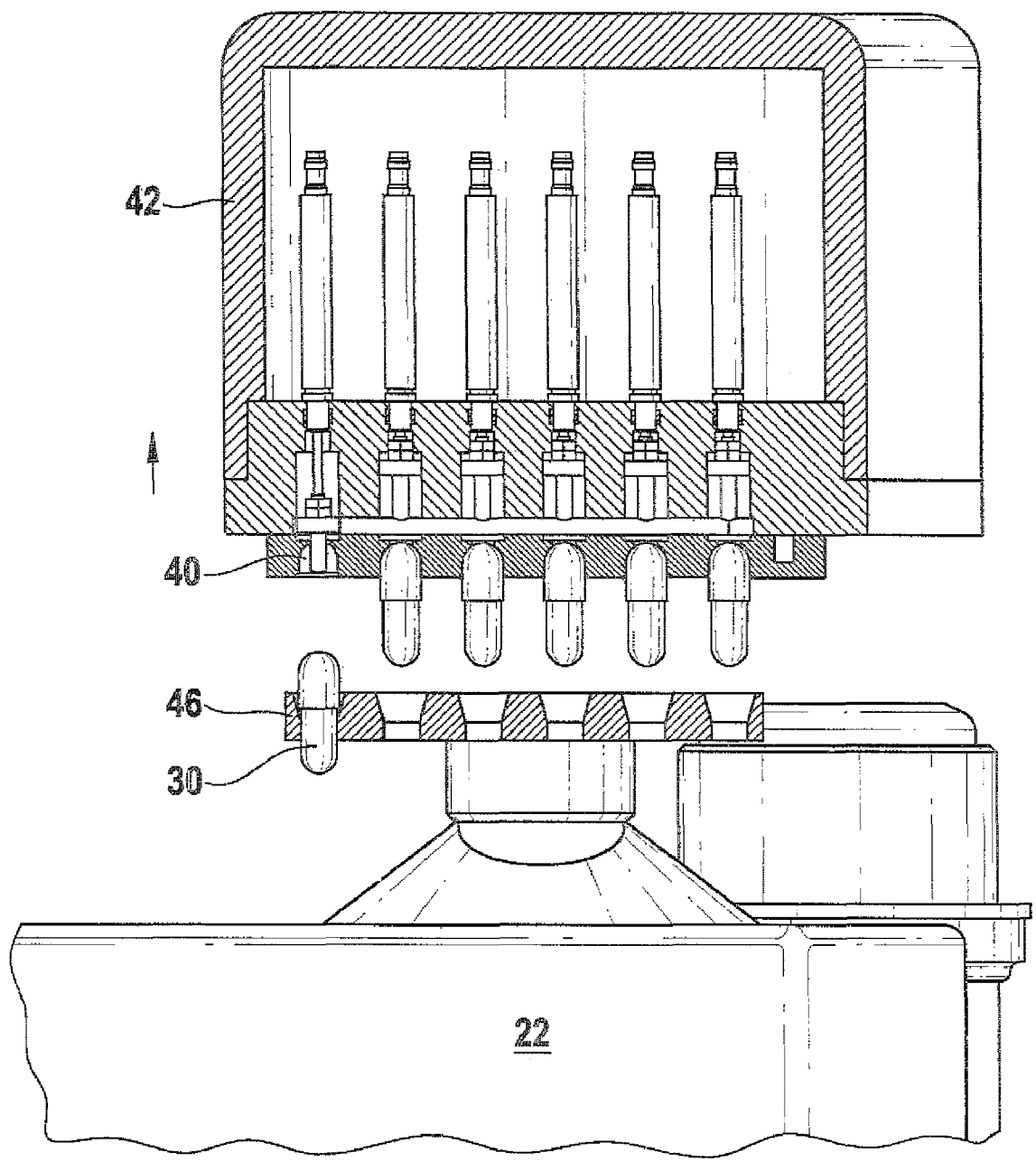
FIG. 11 shows the raising of the lifting device with the rest of the capsules.
Figure 12:
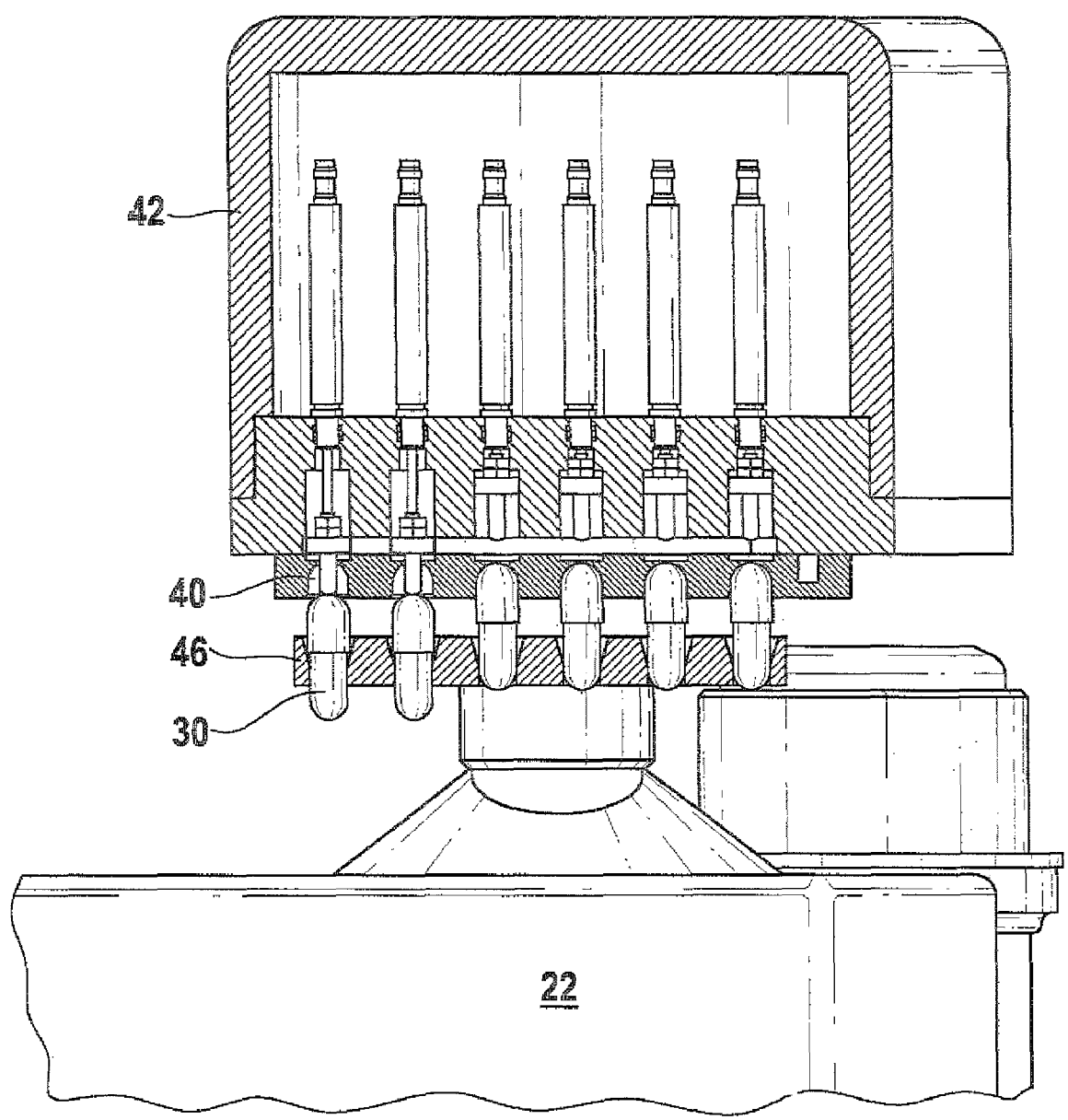
FIG. 12 shows the depositing of the second capsule.
Figure 13:
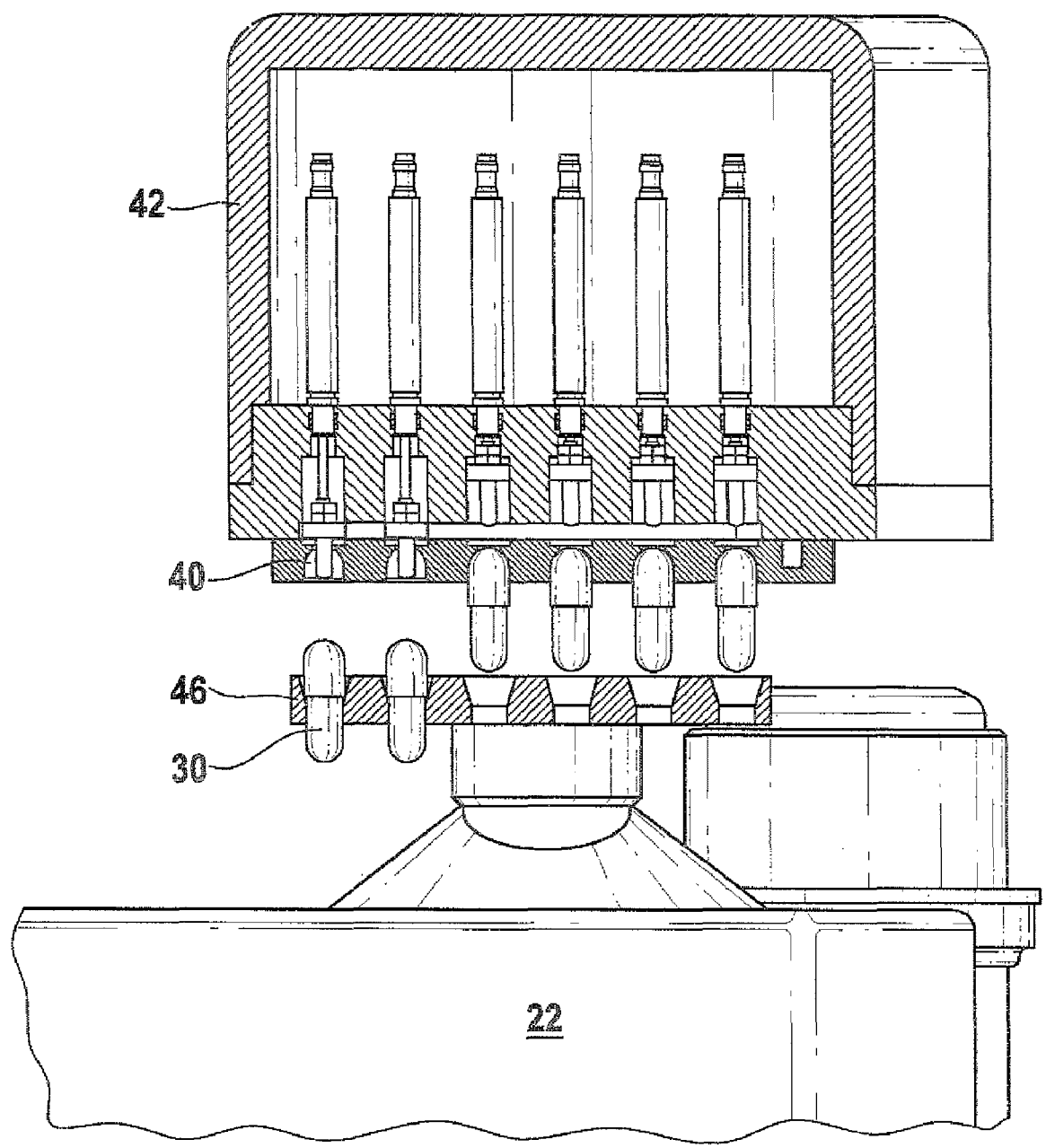
FIG. 13 shows the raising of the rest of the capsules and the weighing of the remaining two capsules.
Figure 14:
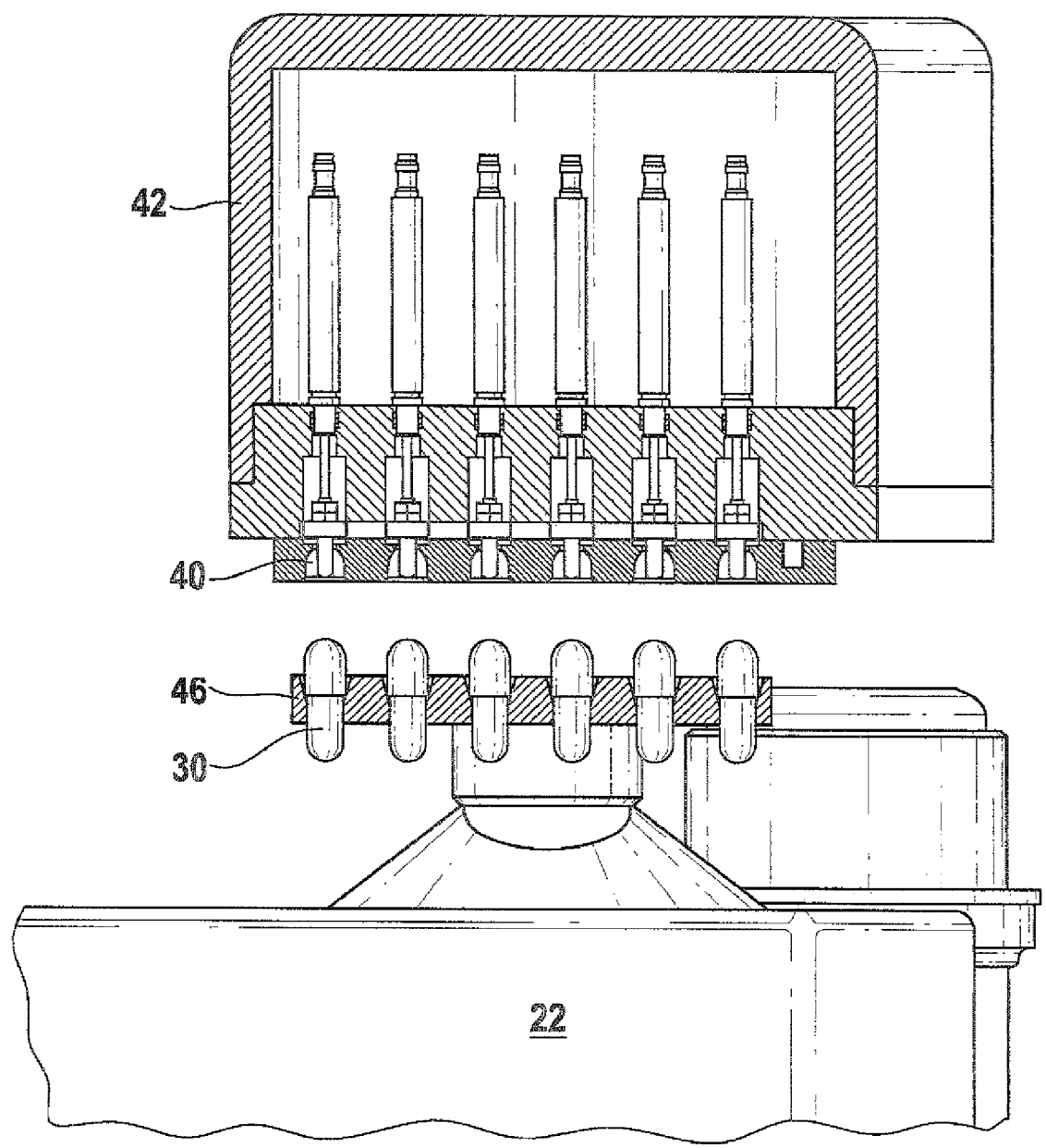
FIG. 14 shows the weighing of all of the capsules.

The transfer device brings the capsules 30 into alignment with a weighing dish 46 of the weighing device 22. The transfer device 42 lowers all of the capsules 30 into the corresponding openings of the weighing dish 46 (FIG. 9). According to FIG. 10, the first capsule 30 is deposited into the corresponding recess of the weighing dish 46 and to this end, the vacuum supplied to the first vacuum bore is switched off while continuing to be supplied to the other vacuum bores 40. After the transfer device 42 is raised, the tare weight of the first deposited capsule 30 is determined with the aid of a weighing device 22 (FIG. 11). In the next step, the next capsule 30 is deposited into the weighing dish 46 and to this end, the vacuum supplied to the second vacuum bore is switched off (FIG. 12). Then the transfer device 42 lifts the remaining (four) capsules 30 away from the weighing dish 46 in order to enable the weighing procedure of the capsules 30 remaining in the weighing dish 46 (FIG. 13). An evaluation unit determines the tare weight of the second capsule 30 by subtracting the tare weight of the first capsule 30 determined as shown in FIG. 11 from the total weight of the two empty capsules 30. This method repeats for the next capsule 30 to be weighed until all of the capsules 30 have been deposited in the weighing dish 46, as shown in FIG. 14.

The depositing of the capsules into the weighing dish 21 occurs in a fashion analogous to the removal procedure. It is also possible to supply vacuum to the openings that accommodate the capsule bottoms as the capsules 30 are being deposited into the capsule holder 21. This is to provide an improved fixing when the transfer device 42, in the process of depositing of the capsules 30, moves upward away from the deposited capsules 30. The vacuum supplied to the capsule bottoms can also be used to open the capsules 30 if the vacuum is provided to the vacuum bores 40 in parallel with the upward movement of the transfer device 42. This results in the opening of the capsules 30.

The transfer process described above in connection with station 3 is also used at station 9. The additional weighing device determines the gross weight of the filled capsules 30. Based on the tare weight of the capsules determined at station 3, it is possible to determine the net weight of the filling that has been dispensed into each capsule 30.

The foregoing relates to the preferred exemplary embodiment of the invention, it being understood that other variants and embodiments thereof are possible within the spirit and scope of the invention, the latter being defined by the appended claims.

The invention claimed is:

1. A method for transferring a plurality of capsules, comprising the following steps: preparing the plurality of capsules to be removed simultaneously from a filled capsule holder, the capsule holder being composed of a plurality of vertically disposed openings into which the plurality of capsules to be transferred have been each placed vertically into one of the openings; positioning a transfer device vertically above the capsule holder filled with the plurality of capsules, the transfer device having a plurality of vacuum bores which align with the plurality of openings in the capsule holder for removal thereof; simultaneously applying a vacuum through the vacuum bores to the tops of the plurality of capsules in the capsule holder; exerting a force on a bottom of all the capsules by means of a plurality of transport pins which are aligned with and situated underneath the openings in the capsule holder and which are able to move vertically toward an underside of the capsules and through the openings for reinforcement on the bottom of the capsules; and lifting the capsules from the capsule holder while maintaining the vacuum on the top of the capsules and while exerting the force on the bottom of the capsules, thereby completely removing all the capsules from the capsule holder simultaneously.

2. The method according to claim 1, wherein the step of positioning the transfer device vertically above the capsule holder filled with the plurality of capsules includes the step of pivoting the transfer device from a remote position to a position when the plurality of vacuum bores in the transfer device align with the plurality of openings in the capsule holder.

3. The method according to claim 1, further comprising an additional step of depositing the plurality of capsules from the transfer device into a weighing dish of a weighing device by deactivating the vacuum, the weighing dish having corresponding vertically disposed openings for receiving the plurality of capsules from the transfer device.

4. The method according to claim 3, wherein after the step of depositing the plurality of capsules from the transfer device into the weighing dish, further comprising an additional step of depositing the plurality of capsules from the transfer device back into the plurality of openings in the capsule holder simultaneously.

5. The method according to claim 3, wherein the step of depositing the plurality of capsules from the transfer device into the weighing dish, includes the step of pivoting the transfer device from a position when the plurality of vacuum bores in the transfer device align with the plurality of openings in the capsule holder to a position when the vacuum bores in the transfer device align with the corresponding vertically disposed openings in the weighing dish.

6. The method according to claim 3, wherein the step of depositing the plurality of capsules from the transfer device into the weighing dish has steps further comprising:
   lowering all the plurality of capsules simultaneously into the openings of the weighing dish by vertically lowering the transfer device,
   switching off the vacuum supplied to a first capsule thereby releasing the first capsule from the transfer device and depositing the first capsule into its corresponding opening in the weighing dish while continuing to supply vacuum to all remaining capsules,
   raising all remaining capsules from the weighing dish by vertically raising the transfer device, and
   weighing said first capsule.

7. The method according to claim 6, wherein after the step of depositing the plurality of capsules from the transfer device into the weighing dish, further comprising an additional step of depositing the plurality of capsules from the transfer device back into the plurality of openings in the capsule holder simultaneously.

8. The method according to claim 6, wherein the step of depositing the plurality of capsules from the transfer device into the weighing dish, includes the step of pivoting the transfer device from a position when the plurality of vacuum bores in the transfer device align with the plurality of openings in the capsule holder to a position when the vacuum bores in the transfer device align with the corresponding vertically disposed openings in the weighing dish.

9. The method according to claim 6, further comprising:
lowering the remaining capsules into the openings of the weighing dish,
switching off the vacuum supplied to a second capsule thereby releasing the second capsule from the transfer device and depositing the second capsule into its corresponding opening in the weighing dish while continuing to supply vacuum to all other capsules except the first capsule and the second capsule,
raising all of the other capsules except the first capsule and the second capsule from the weighing dish by vertically raising the transfer device,
weighing said first and second capsules, and
determining the weight of the second capsule by subtracting the weight of the first capsule from the total weight of the two capsules.

10. The method according to claim 9, wherein the step of depositing the plurality of capsules from the transfer device into the weighing dish, includes the step of pivoting the transfer device from a position when the plurality of vacuum bores in the transfer device align with the plurality of openings in the capsule holder to a position when the vacuum bores in the transfer device align with the corresponding vertically disposed openings in the weighing dish.

11. The method according to claim 9, wherein after the step of depositing the plurality of capsules from the transfer device into the weighing dish, further comprising an additional step of depositing the plurality of capsules from the transfer device back into the plurality of openings in the capsule holder simultaneously.

12. The method according to claim 11, depositing the plurality of capsules from the transfer device back into the plurality of openings in the capsule holder simultaneously, includes the step of pivoting the transfer device from a position when the vacuum bores in the transfer device align with the corresponding vertically disposed openings in the weighing dish to a position when the plurality of vacuum bores in the transfer device align with the plurality of openings in the capsule holder.

13. An apparatus which operates according to the method of claim 1, comprising the transfer device which transfers the capsules to a weighing device.

14. The apparatus according claim 13, further comprising the transfer device including vacuum bores through which the vacuum can be applied to the capsules, and transport pins supporting the capsules while the capsules are being removed from the capsule holder.

15. The apparatus according claim 13, wherein the transfer device includes vacuum bores through which the vacuum can be applied to the capsules.

16. The apparatus according to claim 13, further comprising the capsule holder for transporting the capsules.

17. The apparatus according to claim 16, wherein the transfer device includes vacuum bores through which the vacuum can be applied to the capsules.

18. The apparatus according to claim 16, further comprising the transport pins supporting the capsules while the capsules are removed from the capsule holder.

19. The apparatus according claim 18, wherein the transfer device includes vacuum bores through which the vacuum can be applied to the capsules.

20. The apparatus according to claim 18, wherein the transport pins are movable in a capsule removal direction or in a capsule depositing direction relative to the capsule holder.

21. The apparatus according claim 20, wherein the transfer device includes vacuum bores through which the vacuum can be applied to the capsules.

\* \* \* \* \*